United States Patent [19]
Mizusawa et al.

[11] Patent Number: 4,579,887
[45] Date of Patent: Apr. 1, 1986

[54] NON-AQUEOUS DISPERSIONS OF RELATIVELY HIGH MOLECULAR WEIGHT EPOXY RESINS

[75] Inventors: Anita E. Mizusawa, Angleton; Rhetta Q. Davis, Lake Jackson, both of Tex.

[73] Assignee: The Dow Chemical Company, Midland, Mich.

[21] Appl. No.: 706,055

[22] Filed: Feb. 26, 1985

[51] Int. Cl.$^4$ .............................................. C09D 3/58
[52] U.S. Cl. ................................ 523/406; 523/400; 523/407; 523/408; 523/412; 523/423; 428/418
[58] Field of Search ............... 523/400, 406, 407, 408, 523/412, 423; 428/418

[56] References Cited

U.S. PATENT DOCUMENTS

| | | | |
|---|---|---|---|
| 3,232,903 | 2/1966 | Schmidle et al. | 523/427 |
| 3,264,234 | 8/1966 | Osmond | 525/77 |
| 3,321,430 | 5/1967 | Ott et al. | 523/423 |
| 3,736,279 | 5/1973 | Camelon et al. | 525/517.5 |
| 3,814,720 | 6/1974 | Maker et al. | 524/531 |
| 3,814,721 | 6/1974 | Maker et al. | 524/504 |
| 4,028,294 | 6/1977 | Brown et al. | 523/423 |
| 4,151,131 | 4/1979 | Sekmakas et al. | 523/423 |
| 4,212,781 | 7/1980 | Evans et al. | 523/403 |
| 4,285,847 | 8/1981 | Ting | 524/458 |
| 4,294,741 | 10/1981 | Bosso | 523/423 |
| 4,308,185 | 12/1981 | Evans et al. | 523/423 |
| 4,335,028 | 6/1982 | Ting et al. | 524/504 |
| 4,341,682 | 7/1982 | Tobias | 523/406 |
| 4,443,568 | 4/1984 | Woo | 523/406 |
| 4,444,923 | 4/1984 | McCarty | 523/406 |
| 4,446,258 | 5/1984 | Chu et al. | 523/423 |

FOREIGN PATENT DOCUMENTS

| | | | |
|---|---|---|---|
| 54-123185 | 9/1979 | Japan | 523/406 |
| 59-145211 | 8/1984 | Japan | 523/409 |

*Primary Examiner*—Ronald W. Griffin
*Attorney, Agent, or Firm*—James G. Carter

[57] ABSTRACT

Non-aqueous dispersions are disclosed which contain (A) a relatively high molecular weight epoxy resin, (B) a non-aqueous dispersion medium, and (C) a dispersant such as a copolymer of (1) at least one polymerizable ethylenically unsaturated monomer containing a group reactive with an epoxy group and (2) at least one polymerizable ethylenically unsaturated monomer free of any groups reactive with an epoxy group.

These dispersions are useful in coatings, electrical or structural laminates or composites, body solders, adhesives, caulking compounds, casting compounds, filament winding and the like.

9 Claims, No Drawings

NON-AQUEOUS DISPERSIONS OF RELATIVELY HIGH MOLECULAR WEIGHT EPOXY RESINS

BACKGROUND OF THE INVENTION

The present invention concerns non-aqueous dispersions of relatively high molecular weight epoxy resins.

Industry is constantly seeking ways to reduce the amount of solvents into the atmosphere from coatings and the like. Among the epoxy resin coating compositions presently employed are the solutions of such epoxy resins in oxygen-containing solvents such as glycol ethers, ketones and the like. However, in order to attain suitable application viscosities, high levels of solvents must usually be employed.

The present invention provides for the use of lower cost hydrocarbon diluents and much lower concentrations of diluents or much higher concentrations of epoxy resin in order to achieve suitable application viscosities.

SUMMARY OF THE INVENTION

The present invention pertains to a non-aqueous dispersion comprising (A) at least one relatively high molecular weight epoxy resin;

(B) a non-aqueous dispersion medium; and (C) a dispersant composition comprising a polymer prepared from (1) at least one polymerizable ethylenically unsaturated monomer containing a group reactive with an epoxy group and (2) at least one polymerizable ethylenically unsaturated monomer free of groups reactive with an epoxy group; wherein (i) component (A) is present in quantities of from about 30 to about 75, preferably from about 50 to about 75, percent by weight of the combined weight of the combined weight of components (A), (B) and (C);

(ii) component (B) is present in quantities of from about 20 to about 60, preferably from about 20 to about 45, percent by weight of the combined weight of the combined weight of components (A), (B) and (C);

(iii) component (C) is present in quantities of from about 1 to about 60, preferably from about 5 to about 21, percent by weight of the combined weight of the combined weight of components (A), (B) and (C);

(iv) component (C-1) is present in an amount which provides from about 0.1 to about 100, preferably from about 0.5 to about 6, percent by weight of the combined weight of components (C-1) and (C-2); and (v) component (C-2) is present in an amount which provides from about 0 to about 99.9, preferably from about 94 to about 99.5, percent by weight of the combined weight of components (C-1) and (C-2).

DETAILED DESCRIPTION OF THE INVENTION

Suitable relatively high molecular weight epoxy resins which can be employed herein include, for example, those represented by the following general formulas

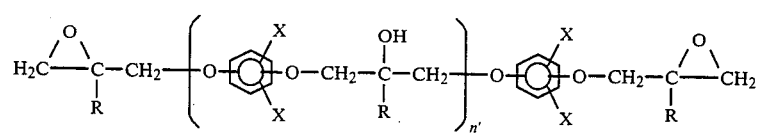

I.

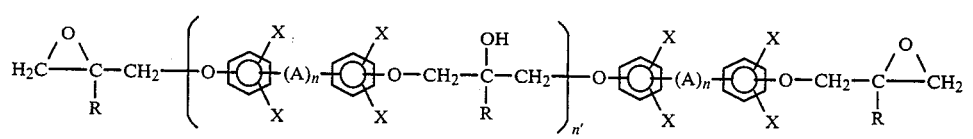

II.

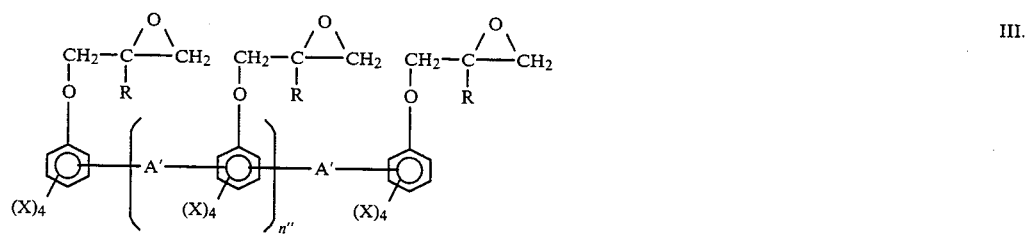

III.

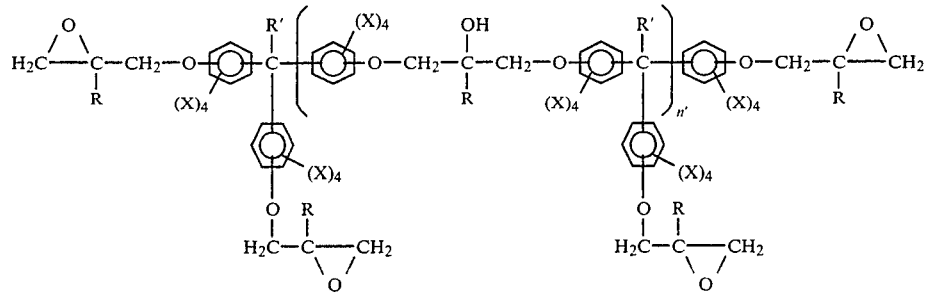

or mixtures of compounds represented by such formulas wherein each A is independently a divalent hydrocarbon group having from one to about 8 carbon atoms, —O—, —S—, —S—S—,

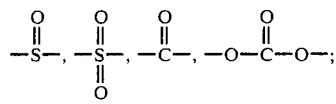

each A' is independently a divalent hydrocarbon group having from 1 to about 8 carbon atoms; each R is independently hydrogen or an alkyl group having from 1 to about 4 carbon atoms; R' is hydrogen or a hydrocarbyl group having from 1 to about 8 carbon atoms; each X is independently hydrogen, chlorine, bromine or an aromatic aliphatic or cycloaliphatic hydrocarbyl or hydrocarbyloxy group having from 1 to about 8 carbon atoms; n has an average value of zero or 1; n' has an average value of from 2 to about 15 and n'' has an average value of from about 1.01 to about 8.

Any compound containing a polymerizable ethylenically unsaturated group can be employed herein.

Suitable polymerizable ethylenically unsaturated monomers free of groups reactive with an epoxy group which can be employed herein include, for example, those represented by the formulas

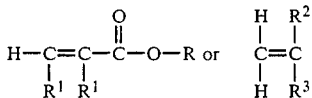

wherein R is hydrogen or a hydrocarbyl group having from about 1 to about 20, preferably from about 1 to about 10 carbon atoms; each $R^1$ is independently hydrogen or a hydrocarbyl group having from 1 to about 20, preferably from 1 to about 10 carbon atoms; $R^2$ is hydrogen, halogen or a hydrocarbyl group having from 1 to about 20, preferably from about 1 to about 10, carbon atoms and $R^3$ is hydrogen, halogen or a hydrocarbyl group having from 1 to about 20, preferably from about 1 to about 10 carbon atoms, preferably at least one of $R^1$ and $R^2$ is hydrogen or a methyl group. Additionally, $R^2$ can contain a —C≡N group.

Particularly suitable monomers include, for example, α-methyl styrene, 2-methyl styrene, 4-methyl styrene, t-butyl styrene, 4-methoxystyrene, 4-phenyl styrene, 3-phenyl-1-propene, 2-chloro styrene, 4-chloro styrene, vinyl cyclopentane, vinyl cyclohexane, vinyl naphthalene, vinyl methyl ether, vinyl ethyl ether, vinyl propyl ether, vinyl isopropyl ether, vinyl butyl ether, vinyl isobutyl ether, vinyl sec-butyl ether, vinyl tert. butyl ether, vinyl hexyl ether, vinyl octyl ether, vinyl methyl ketone, methyl isopropenyl ketone, vinyl formate, vinyl acetate, vinyl propionate, vinyl chloroacetate, vinyl trifluoroacetate, vinyl benzoate, 2-vinyl pyridine, vinyl pyrrolidone, vinyl carbazole, methyl acrylate, ethyl acrylate, propyl acrylate, isopropyl acrylate, butyl acrylate, isobutyl acrylate, sec butyl acrylate, tert butyl acrylate, 2-ethylhexyl acrylate, 2-hydroxyethyl acrylate, 2-hydroxy propylacrylate, methyl methacrylate, ethyl methacrylate, propyl methacrylate, isopropyl methacrylate, butyl methacrylate, isobutyl methacrylate, sec butyl methacrylate, tert butyl methacrylate, 2-ethyl butyl methacrylate, 2-hydroxyethyl methacrylate, 2-hydroxypropyl methacrylate, hexyl methacrylate, octyl methacrylate, dodecyl methacrylate, 2-hydroxybutyl methacrylate, octadecyl methacrylate, phenyl methacrylate, benzyl methacrylate, cyclohexyl methacrylate, methyl chloro acrylate, acrylonitrile, methyacrylonitrile, butadiene, vinyl chloride, vinylidene chloride, ethylene, cinnamic acid derivatives, maleic acid derivatives, mixtures thereof and the like.

Suitable monomers which contain an epoxy group or a group reactive with an epoxy group include, for example, acrylic acid, methacrylic acid, acrylamide, hydroxyethyl or hydroxypropyl acrylate, vinyl phenol, isopropenylphenol, isopropenylphenol glycidyl ether, carboxy terminated butadiene-acrylonitrile copolymers, cinnamic acid, maleic acid, glycidyl methacrylate, or styryl glycidyl ether, diglycidyl ether of bisphenol A mono- or dimethacrylate, mixtures thereof and the like.

Suitable free radical initiators which can be employed to polymerize the monomers include, for example, azo compounds and organic peroxide or hydroperoxide compounds.

Suitable azo compounds include those represented by the formula R—N=N—R' wherein each R and R' is independently hydrogen, alkyl, alkoxy or aryl groups having from 1 to about 15 carbon atoms, preferably from about 4 to about 8 carbon atoms which groups may contain a —C≡N moiety. Particularly suitable azo compounds include, for example, 1-t-butylazo-1-cyanocyclohexane, 2-t-butylazo-2-methoxy-4-methyl pentane, 2-t-butylaza-2-cyanopropane, 2-t-butylazo-2-cyanobutane, 2-t-butylazo-2-cyano-4-methyl pentane, 2-t-butylazo-2-cyano-4-methoxy-4-methyl pentane, 2,2'-azobis(2,4-dimethylvaleronitrile), 1,1'-azobis(cyclohexane carbonitrile), and 2,2'-azobis(2-methylbutyronitrile), 2,2'-azobisisobutyronitrile, mixtures thereof and the like.

Suitable organic peroxide compounds include those represented by the formula R—O—O—R' or ROO(-CO)R' wherein each R and R' is independently hydrogen, alkyl or aryl groups having from about 1 to about 15, preferably from about 1 to about 8, carbon atoms. Particularly suitable organic peroxides include, for example, cumene hydroperoxide, dicumyl peroxide, t-butyl perbenzoate, t-butyl peroctoate, di-t-butyl peroxide, t-butyl hydroperoxide, lauroyl peroxide, methyl ether ketone peroxide, and chlorobenzoyl peroxide, mixtures thereof and the like.

The quantity of free radical polymerization catalyst which is employed depends upon the particular monomer or combination of monomers and catalyst being utilized and is usually in the range of from about 0.1 to about 10, preferably 0.5 to about 8 percent by weight based upon the weight of the monomer or combination of monomers.

The polymerization of the monomer is conducted at a temperature of from about 80° to about 220° C., preferably from about 100° to about 180° C.

Several factors affect the molecular weight of the addition polymer, such as the polymerization temperature and the initiator level. The addition polymer molecular weight can be effectively lowered through the use of chain transfer agents, such as, for example, halogenated solvents, mercaptans and the like without using higher levels of the expensive free radical initiators and without changing the reaction temperature. Ethylene dichloride, ethylene dibromide, tetrachloroethane, carbon tetrachloride, carbon tetrabromide, bromoform, chloroform, n-butyl mercaptan, dodecyl mercaptan and the like are effective chain transfer agents. Use of volatile chain transfer agents may necessitate the use of a vacuum strip step in the process.

Suitable non-aqueous dispersion media include, any inert material in which the epoxy resin is substantially insoluble such as, for example, any aromatic or aliphatic hydrocarbon materials having from about 4 to about 28 carbon atoms such as, for example, hexanes, xylene, Isopar Ⓡ E and Isopar Ⓡ M commercially available from Exxon Chemical Company Super High Flash Naphtha commercially available from Union 76 as SOLV G, cycloketones such as cyclohexanone, methyl amylketone, chlorinated solvents such as perchloroethylene, mixtures thereof and the like.

In the most preferred process an advanced epoxy resin (EEW 575–4000) is melted at a suitable temperature (120° C.–160° C.). The molten resin is cooled to a suitable temperature and a diluent is added. For solvents with a boiling point below 150° C. the preferred temperature for addition is slightly below the boiling point of the solvent (5 to 10 degrees) and for solvents with a boiling point above 150° C. the addition is performed at 150° C. After the resin solution is made the temperature is maintained between 120° C.–150° C. during polymerization. The polymerization is accomplished by continuous addition of the vinyl monomers and the free radical initiator simultaneously. The temperature is maintained at the polymerization temperature 10–60 minutes after addition is complete. The remainder of the solvent is added and the mixture is cooled to yield a dispersion.

In an equally preferred process for an advanced resin with a lower viscosity (EEW 400–975), the polymerization step can be performed in situ in the molten resin alone with no diluent. The resin is heated to 150° C. and the monomers and initiator are added dropwise. After complete addition the mixture is allowed to digest for 10 minutes–60 minutes at 150° C. The mixture is cooled to 70° C.–100° C. and the dispersion media is added to form a dispersion of a lower molecular weight epoxy resin.

In an alternate process a small portion (0.01–0.25 equivalent percent) of the epoxy functionality is prereacted with the vinyl acid to give an epoxy acrylate or methacrylate ester. This reaction is either catalyzed by a suitable catalyst such as, for example, ethyltriphenylphosphonium acetate.acetic acid complex or heat catalyzed at 115° C.–150° C. under an oxygen pad. This epoxy monomer is then copolymerized by simultaneous addition of a comonomer with the free radical initiator and the dispersion is formed as previously described.

In an alternate process the vinyl polymerization is performed in the liquid epoxy resin which has been heated to 150° C. Simultaneous addition of the vinyl monomers with the free radical initiator to the liquid resin under a $N_2$ pad results in the polymer formation in a low molecular weight liquid epoxy resin that is advanced by addition of bisphenol A and a suitable catalyst to the desired equivalent weight. This mixture is then dispersed by adding a suitable non-aqueous dispersion media to the molten mixture slightly below the boiling point of the diluent.

The compositions of the present invention are useful in such applications as coatings, structural and electrical laminates or composites, adhesives, caulking compositions, body solders, casting compositions, filament winding and the like.

The following examples are illustrative of the invention but are not to be construed as to limiting the scope thereof in any manner.

The following components were employed in the examples.

EPOXY RESIN A is a diglycidyl ether of bisphenol A having an average epoxide equivalent weight (EEW) of 475–575 and a Durran's Softening Point of 70°–80° C.

EPOXY RESIN B is a diglycidyl ether of bisphenol A having an average EEW of 1600–2000 and a Durran's Softening Point of 115°–130° C.

EPOXY RESIN C is a diglycidyl ether of bisphenol A having an average EEW of 2000–3500 and a Durran's Softening Point of 120°–140° C.

EPOXY RESIN D is a diglycidyl ether of bisphenol A having an average EEW of 3500–5500 and a Durran's Softening Point of 135°–155° C.

EPOXY RESIN CURING AGENT A is diethylene triamine.

ISOPAR M is a relatively high boiling, narrow cut isoparaffinic solvent having a flash point of about 77° C. and a boiling range of from about 207° to about 260° C. commercially available from Exxon Company, U.S.A.

ISOPAR E is an isoparaffinic hydrocarbon fraction having a boiling range of about 116° to about 134° C. commercially available from Exxon Company, U.S.A.

SAG 100 is a silicone antifoam compound commercially available from Union Carbide Corporation.

SUPER HIGH FLASH NAPHTHA (SHFN) is a volatile aromatic hydrocarbon solvent having a boiling range of about 156° to about 180° C. commercially available from Union 76.

DESCRIPTION OF COATINGS TEST METHODS

Gloss

Gloss was measured using a Mallinckrodt multi gloss meter following the DIN 67.530. The resin was coated onto a Parker test panel and cured. A beam of light is directed at the coating and the percent reflectance was measured by detecting the amount of light reflected off the coating. The incident beam was angled at 20° and 60°.

Cross Hatch Adhesion

The Cross Hatch adhesion test was used to determine the adhesion of the coating to the metal substrate. The coating was etched in a lattice pattern with either six or eleven cuts in each direction. A pressure sensitive tape is applied over the lattice and then pulled off. The adhesion was evaluated by descriptions and illustrations from ASTM 3359-83 and by determining the amount of coating that was lost or retained. In the water boil cross hatch adhesion test the coating was etched and tested (Preboil test) then it was boiled in test water for one hour and tested (Postboil test) as described above.

Mek Double Rub Test (Methyl Ethyl Ketone)

This test was used to evaluate the chemical resistance of the coating. A swatch of cotton gauze was fastened to the rounded end of the hammer and was then dipped into a beaker of methyl ethyl ketone. The excess solvent was shaken off and the hammer moved back and forth over the coating until failure occurred. The only pressure on the coating was from the weight of the hammer head.

Gardner Impact (Reverse & Forward)

Gardner Impact was used to determine the impact resistance (and flexibility) of a coating. A three pound weight was dropped onto a coated Parker test panel from a height that corresponds to a certain number of inch-pounds following DIN 53.153 (ASTM D-2794).

If the weight was dropped directly onto the coating itself it is called forward impact and it is called reverse impact if it is dropped onto the metal surface.

EXAMPLE 1

Epoxy Resin A (134.9 g) was charged into a reaction vessel equipped with stirring, a nitrogen purge, a condenser and a temperature controller. With stirring and $N_2$ purge on, the resin was melted. When a temperature of 120°–125° C. was attained, a monomer feed consisting of lauryl methacrylate (33.73 g), acrylic acid (0.13 g) and tertiary butyl perbenzoate (2.4 g) as a catalyst was added dropwise. After complete addition, the vessel was maintained at 120°–125° C. for one hour (3600 s). After that time, 110 g of Isopar M was added dropwise. The dispersion was then stirred at 120° C. for approximately 1.5 hours (5400 s). The dispersion was then cooled to yield a stable dispersion. The resultant dispersion contained 61% solids by weight and had a viscosity at 23° C. of 96 cps (0.096 Pa.s).

EXAMPLE 2

Epoxy Resin B (134.91 g) was charged into a reaction vessel equipped with stirring, $N_2$ purge, a condenser and a temperature controller. With stirring and $N_2$ purge, 107 g of super high flash naphtha (SHFN) was added and the solution stirred for 5 minutes (300 s). A monomer feed of 40 g styrene, 0.5 g acrylic acid and 3.3 g tertiary butyl perbenzoate or catalyst was added at 150° C. over approximately 10 minutes (600 s). Heating was continued for one hour (3600 s) at 150° C. SHFN (75 g) was added and the mixture was cooled to 80° C. with stirring to yield an iridescent dispersion of Epoxy Resin B in SHFN. The resultant dispersion had an average particle size of less than 1 micron and a viscosity at 23° C. of 240 cps (0.24 Pa.s).

EXAMPLE 3

Epoxy Resin B (134.9 g) was charged into a reaction vessel equipped with stirring, a nitrogen purge, a condenser and a temperature controller. With stirring and $N_2$ purge on, the resin was melted. When a temperature of 120°–125° C. was attained, a monomer feed consisting of lauryl methacrylate (10 g), styrene (10 g), acrylic acid (0.14 g) and tertiary butyl perbenzoate (1.67 g) as a catalyst was added dropwise. After complete addition, the vessel was maintained at 120°–125° C. for one hour (3600 s). After that time, a mixture of 50 g of xylene and 50 g of hexane was added dropwise. The dispersion was then stirred at 120° C. for approximately 1.5 hours (5400 s). The dispersion was then cooled to yield a stable dispersion. The resultant dispersion contained 63% solids and had a viscosity at 23° C. of 64 cps (0.064 Pa.s).

EXAMPLE 4

Epoxy Resin B (134.9 g) was charged into a reaction vessel equipped with stirring, a nitrogen purge, a condenser and a temperature controller. With stirring and $N^2$ purge on, the resin was melted. When a temperature of 120°–125° C. was attained, a monomer feed consisting of styrene (40 g), acrylic acid (0.5 g), and tertiary butyl perbenzoate (3.3 g) as a catalyst was added dropwise. After complete addition, the vessel was maintained at 120°–125° C. for one hour (3600 s). After that time, a mixture of 92 g of Super High Flash Naphtha and 15 g cyclohexanone was added dropwise. The dispersion was stirred at 120° C. for approximately 1.5 hours (5400 s). The dispersion was then cooled to yield a stable dispersion. The resultant dispersion contained 50% solids and had a viscosity at 23° C. of 960 cps (0.96 Pa.s).

COMPARATIVE EXPERIMENT A

For comparative purposes, a solution of Epoxy Resin B 60.6 percent by weight in the n-butylether of diethylene glycol was prepared. The resulting solution had a viscosity at 23° C. of 53,600 cps (53.6 Pa.s).

EXAMPLE 5

Epoxy Resin C (134.91 g) in reaction vessel equipped as in Example 1 was heated to melt the resin at a temperature of approximately 170° C. The resin was cooled to 150° C. and stirred for 10 minutes (600 s). Xylene (100 g) was added dropwise. A monomer feed of 12 g styrene, 0.08 g acrylic acid and 1.12 g tertiary butyl perbenzoate as a catalyst was begun after addition of xylenes was complete. Addition of monomer mixture was complete in 5–10 minutes (300–600 s). The solution was heated for 5–15 minutes (300–900 s) at 150° C. The solution was then cooled and more xylene (20–50 gms) was added. The product was put in a jar and left on a shaker overnight. A white dispersion of Epoxy Resin C in xylene resulted. The resultant dispersion contained 52% solids by weight and had a viscosity at 23° C. of 928 cps (0.928 Pa.s).

EXAMPLE 6

Epoxy Resin C (134.91 g) in reaction vessel equipped as in Example 1 was heated to melt the resin at a temperature of approximately 170° C. The resin was cooled to 150° C. and stirred for 10 minutes (600 s). Xylene (100 g) was added dropwise. A monomer feed of 10 g laurylmethacrylate, 0.14 g acrylic acid and 1.74 g tertiary butyl perbenzoate as a catalyst was begun after addition of xylenes was complete. Addition of monomer mixture was complete in 5–10 minutes (300–600 s). The solution was heated for 5–15 minutes (300–900 s) at 150° C. The solution was then cooled and more xylene (20–50 gms) was added. The product was put in a jar and left on a shaker overnight. A white dispersion of Epoxy Resin C in xylene resulted. The resultant dispersion contained 52% solids by weight and had a viscosity at 23° C. of 400 cps (0.4 Pa.s).

COMPARATIVE EXPERIMENT B

For comparative purposes, a solution of 51 percent by weight of epoxy resin C in the n-butyl ether of diethylene glycol was prepared. The resultant solution had a viscosity at 23° C. for 22,780 cps (22.78 Pa.s).

EXAMPLE 7

Epoxy Resin D (79.36 g) was melted in a reaction vessel equipped with stirring, condenser and $N_2$ purge. With stirring and heating, the resin was mixed with 57.34 g SHFN and heated to 150° C. The solution was stirred for 10 minutes (600 s). A monomer addition of 20 g styrene, 1.65 tertiary butyl perbenzoate as a catalyst and 0.14 g acrylic acid was continuously fed into the reactor over a period of 5–15 minutes (300–900 s). Heating was continued for one hour (3600 s) at 150° C. Heating was discontinued, 50 g of SHFN was added and the solution was put on a shaker overnight. The final result was an iridescent bluish white dispersion of Epoxy Resin D. The resultant dispersion contained 44% soids.

EXAMPLE 8

A. Preparation of Coating From Dispersion Prepared in Example 3

25 g (0.009 equiv.) of the dispersion prepared in Example 3 was mixed with 0.18 g (0.009 equivalent) of epoxy curing agent A. A surfactant SAG 100 (.16 g) and 5–10 gms of a 50-50 mixture by weight Isopar ® M and Super High Flash Napthta. The mixture was applied to a Bonderite 40 cold rolled steel test panel. The coated panel was then cured at 150° C. for 15 minutes (900 s). The coating thickness was 0.6 to 1 mils (15.24 to 25.4 mm). The coating properties of the dispersion are shown in Table I.

B. Preparation of Coating From Dispersion Prepared in Example 5

34.0 g (0.006 equiv.) of the dispersion prepared in Example 5 was mixed with 0.12 g (0.006 equiv.) of epoxy curing agent A, a surfactant S.A.G. 100 (0.16 g) and 5–10 g of a 50-50 mixture of xylene-Super High Flash Napthta.

This mixture was coated onto a cold rolled steel Bonderite 40 Parker test panel. (ASTM 4147) The coated panel was cured at 150° C. for 15 minutes (900). The coating thickness was 0.75 to 1 mils (19.05 mm to 25.4 mm). The coating properties of the dispersion are shown in Table I.

COMPARATIVE EXPERIMENT C

A solution coating was prepared from a solution of Epoxy Resin B as follows.

24.6 g (0.009 equiv.) of an epoxy resin solution of epoxy resin B (63% by weight) in methyl amyl ketone (37% by weight) was mixed with 0.18 g (0.009 equiv.) of curing agent A. The solution was applied to a Bonderite 40 cold rolled steel test panel. The coated panel was then cured at 150° C. for 15 minutes (900 s). The coating thickness was 0.6 to 1 mils (15.24 to 25.4 mm). The coating properties are shown in Table I.

COMPARATIVE EXPERIMENT D 25.06 g (0.006 eq) of a solution of epoxy resin C (52% by weight) in methyl amyl ketone (48% by weight was mixed with 0.16 g (0.007 equiv.) of curing agent A. The solution was applied to a Bonderite 40 cold rolled steel test panel. The coated panel was cured at 150° C. for 15 minutes (900 s). The coating thickness was 0.75 to 1 mils (19.05 to 25.4 mm). The coating properties are shown in Table I.

TABLE I

| PROPERTY | EXAMPLE OR COMPARATIVE EXPERIMENT | | | |
|---|---|---|---|---|
| | EXAMPLE 8A | COMP. EXPT. C | EXAMPLE 8B | COMP. EXPT. D |
| Gloss, 60° | 100% | 100% | 100% | 100% |
| 20° | 52–54% | 56–58% | 59% | 60–70% |
| Reverse Impact, in-lbs | 90 | 90 | 140 | 140 |
| J | 10.17 | 10.17 | 15.82 | 15.82 |
| Forward Impact, in-lbs | 160 | 150 | 140 | 140 |
| J | 18.08 | 16.95 | 15.82 | 15.82 |
| Cross-Hatch Adhesion | | | | |
| Preboil | 100% adhesion | 100% adhesion | 100% adhesion | 100% adhesion |
| Postboil | 95% adhesion | 100% adhesion | 0% adhesion | 0% adhesion |
| MEK Double Rubs | 14 | 50 | 12 | 27 |

We claim:
1. A non-aqueous dispersion comprising
(A) at least one epoxy resin having an average epoxide equivalent weight of at least about 475 and a Durran's softening point of at least about 70° C.;
(B) a non-aqueous dispersion medium; and
(C) a dispersant composition comprising a polymer prepared from
   (1) at least one polymerizable ethylenically unsaturated monomer containing a group reactive with an epoxy group and
   (2) at least one polymerizable ethylenically unsaturated monomer free of groups reactive with an epoxy group; wherein
   (i) component (A) is present in an amount of from about 30 to about 75, percent by weight of the combined weight of components (A), (B) and (C);
   (ii) component (B) is present in an amount of from about 20 to about 60, percent by weight of the combined weight of components (A), (B), and (C);
   (iii) component (C) is present in an amount of from about 1 to about 60, percent by weight of the combined weight of components (A), (B) and (C);
   (iv) component (C-1) is present in an amount which provides from about 0.1 to about 100, percent by weight of the combined weight of components (C-1) and (C-2); and

(v) component (C-2) is present in an amount which provides from about 0 to about 99.9, percent by weight of the combined weight of components (C-1) and (C-2).

2. A non-aqueous dispersion of claim 1
(i) component (A) is present in an amount of from about 50 to about 75, percent by weight of the combined weight of components (A), (B) and (C);
(ii) component (B) is present in an amount of from about 20 to about 45, percent by weight of the combined weight of components (A), (B) and (C);
(iii) component (C) is present in an amount of from about 5 to about 21, percent by weight of the combined weight of components (A), (B) and (C); and
(iv) component (C-1) is present in an amount which provides from about 0.5 to about 6, percent by weight of the combined weight of components (C-1) and (C-2).

3. A non-aqueous dispersion of claim 2 wherein
(i) component (A) is at least one epoxy resin represented by formulas (I), (II) or (III) in the specification wherein each A is independently a divalent hydrocarbon group having from one to about 8 carbon atoms, —O—, —S—, —S—S—,

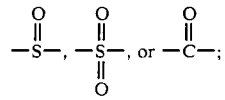

each A' is independently a divalent hydrocarbon group having from 1 to about 8 carbon atoms; each R is independently hydrogen or an alkyl group having from 1 to about 4 carbon atoms; R' is hydrogen or a hydrocarbyl group having from 1 to about 8 carbon atoms; each X is independently hydrogen, chlorine, bromine or a hydrocarbyl or hydrocarbyloxy group having from 1 to about 8 carbon atoms; n has an average value of zero or 1; n' has an average value of from 2 to about 15 and n'' has an average value of from about 2.01 to about 8;
(ii) component (B) is an aromatic or aliphatic hydrocarbon material having from about 6 to about 28 carbon atoms or mixture thereof;
(iii) component (C-1) is at least one monomer represented by formula (IV) in the specification wherein R is hydrogen; each $R^1$ is independently hydrogen or a hydrocarbyl group having from 1 to about 20 carbon atoms; $R^2$ is hydrogen, halogen or a hydrocarbyl group having from 1 to about 20 carbon atoms which hydrocarbyl group may or may not be substituted with a —C≡N group and $R^3$ is hydrogen, halogen, or a hydrocarbyl group having from 1 to about 20 carbon atoms;
(iv) component (C-2) is at least one monomer represented by formulas (IV) or (V) in the specification wherein R is a hydrocarbyl group having from 1 to about 20 carbon atoms; each $R^1$ is independently hydrogen or a hydrocarbyl group having from 1 to about 20 carbon atoms; $R^2$ is hydrogen, halogen or a hydrocarbyl group having from 1 to about 20 carbon atoms which hydrocarbyl groups may or may not be substituted with a —C≡N group and $R^3$ is hydrogen, halogen or a hydrocarbyl group having from 1 to about 20 carbon atoms.

4. A non-aqueous dispersion of claim 3 wherein
(i) component (A) is at least one epoxy resin represented by formula (I) wherein A is a divalent hydrocarbyl group, each X is hydrogen, n has a value of 1 and n' has a value from 2 to about 15;
(ii) component (B) is xylene, hexane, an isoparaffinic hydrocarbon fraction having a boiling range of from about 116° C. to about 134° C., an isoparafinnic hydrocarbon fraction having a boiling range of from about 207° C. to about 260° C., an aromatic hydrocarbon fraction having a boiling range of from about 156° C. to about 180° C. or any combination thereof;
(iii) component (C-1) is acrylic acid, methacrylic acid or a mixture thereof; and
(iv) component (C-2) is styrene, lauryl methacrylate or a mixture thereof.

5. A process for preparing a non-aqueous dispersion which comprises
(I) reacting
(A) at least one epoxy resin having an average epoxide equivalent weight of at least about 475 and a Durran's softening point of at least about 70° C. with
(B) at least one polymerizable ethylenically unsaturated monomer containing a group reactive with an epoxy group;
(II) copolymerizing the product resulting from step (I) with
(C) at least one polymerizable ethylenically unsaturated monomer free of groups reactive with an epoxy group; and
(III) dispersing the product from step (II) in
(D) a non-aqueous dispersion medium;
(i) component (A) is at least one epoxy resin represented by formulas (I), (II) or (III) in the specification wherein each A is independently a divalent hydrocarbon group having from one to about 8 carbon atoms, —O—, —S—, —S—S—,

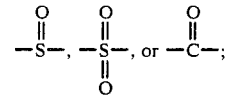

each A' is independently a divalent hydrocarbon group having from 1 to about 8 carbon atoms; each R is independently hydrogen or an alkyl group phaving from 1 to about 4 carbon atoms; R' is hydrogen or a hydrocarbyl group having from 1 to about 8 carbon atoms; each X is independently hydrogen, chlorine, bromine or a hydrocarbyl or hydrocarbyloxy group having from 1 to about 8 carbon atoms; n has an average value of zero or 1; n' has an average value of from 2 to about 15 and n''has an average value of from about 2.01 to about 8; and is present in an amount of from about 30 to about 75 percent by weight of the combined weight of components (A), (B), (C) and (D);
(ii) component (B) is at least one monomer represented by formula (IV) in the specification wherein R is hydrogen; each $R^1$ is independently hydrogen or a hydrocarbyl group having from 1 to about 20 carbon atoms; $R^2$ is hydrogen, halogen or a hydrocarbyl group having from 1 to about 20 carbon atoms which hydrocarbyl group may or may not be substituted with a —C≡N group and $R^3$ is hydrogen, halogen or a hydrocarbyl group having from 1 to about 20 carbon atoms and is present in an amount which provides from about 0.1 to about 100 percent by weight of the combined weight of components (B) and (C);

(iii) component (C) is at least one monomer represented by formulas (IV) or (V) in the specification wherein R is a hydrocarbyl group having from 1 to about 20 carbon atoms; each $R^1$ is independently hydrogen or a hydrocarbyl group having from 1 to about 20 carbon atoms; $R^2$ is hydrogen, halogen or a hydrocarbyl group having from 1 to about 20 carbon atoms which hydrocarbyl groups may or may not be substituted with a —C≡N group and $R^3$ is hydrogen, halogen or a hydrocarbyl group having from 1 to about 20 carbon atoms and is present in an amount which provides; from about 0 to about 99.9 percent by weight of the combined weight of components (B) and (C); and (iv) component (D) is present in an amount of from about 20 to about 60 percent by weight of the combined weight of components (A), (B), (C) and (D).

6. A process of claim 5 wherein
(i) component (A) is present in an amount of from about 50 to about 75 percent by weight of the combined weight of components (A), (B), (C) and (D);
(ii) component (B) is present in an amount which provides from about 0.5 to about 6 percent by weight of the combined weight of components (B) and (C);
(iii) component (C) is present in an amount which provides; from about 94 to about 99.5 percent by weight of the combined weight of components (B) and (C); and
(iv) component (D) is present in an amount of from about 20 to about 25 percent by weight of the combined weight of components (A), (B), (C) and (D).

7. A process of claim 6 wherein
(i) component (A) is at least one epoxy resin represented by formula (I) wherein A is a divalent hydrocarbyl group, each X is hydrogen, n has a value of 1 and n' has a value from 2 to about 15;
(ii) component (B) is acrylic acid, methacrylic acid or a mixture thereof; and
(iii) component (C) is styrene, lauryl, methacrylate or a mixture thereof; and
(iv) component (D) is xylene, hexane, an isoparaffinic solvent having a boiling range of from about 116° C. to about 134° C., an isoparaffinic hydrocarbon fraction having a boiling range of from about 207° C. to about 260° C., an aromatic hydrocarbon fraction having a boiling range of from about 156° C. to about 180° C. or any combination thereof.

8. The product resulting from curing a composition of claims 1, 2, 3 or 4 with a curing quantity of a suitable curing agent or a catalytic quantity of a suitable catalyst or a combination thereof.

9. A product comprising a substrate coated with a composition of claim 8.

* * * * *

UNITED STATES PATENT AND TRADEMARK OFFICE
CERTIFICATE OF CORRECTION

PATENT NO. : 4,579,887
DATED : April 1, 1986
INVENTOR(S) : Anita E. Mizusawa, et al.

It is certified that error appears in the above—identified patent and that said Letters Patent is hereby corrected as shown below:

Col. 1, line 8, "reduoe" should read --reduce--.

Col. 4, line 34, "methyacrylonitrile" should read --methacrylonitrile--.

Col. 9, line 39, "soids." should read --solids.--.

Col. 9, line 65 "(900)." should read --(900 s).--.

Col. 11, line 5, "claim 1" should read --claim 1 wherein--.

Col. 12, line 11, "scrylic" should read --acrylic--.

Col. 12, line 48, "phaving" should read --having--.

Signed and Sealed this

Seventeenth Day of February, 1987

Attest:

DONALD J. QUIGG

Attesting Officer

Commissioner of Patents and Trademarks